United States Patent
Leutner

[15] 3,698,846
[45] Oct. 17, 1972

[54] BALANCING AND ADJUSTING ARRANGEMENT FOR AN EXTRUSION MANDREL

[72] Inventor: Volkmar Leutner, Hemmingen, Germany

[73] Assignee: Indramat, Gesellschaft fur Industrie-Rationalisierung und Automatisierung GmbH, Lohr/Main, Germany

[22] Filed: April 29, 1971

[21] Appl. No.: 138,671

[30] Foreign Application Priority Data

April 30, 1970  Germany..........P 20 21 219.5

[52] U.S. Cl. ................425/149, 425/150, 425/381
[51] Int. Cl............................B29d 23/04, B29f 3/06
[58] Field of Search.......425/145, 146, 149, 150, 381

[56] References Cited

UNITED STATES PATENTS

| | | |
|---|---|---|
| 3,147,515 | 9/1964 | Amsden.....................425/381 |
| 3,218,672 | 11/1965 | Langecker.................425/381 |
| 3,283,363 | 11/1966 | Turner...................425/381 X |

FOREIGN PATENTS OR APPLICATIONS 354,932  7/1961  Switzerland...............425/149

*Primary Examiner*—R. Spencer Annear
*Attorney*—Michael S. Striker

[57] ABSTRACT

Material, particularly synthetic plastic material, extruded through an annular gap between the mouth of an extrusion head and a mandrel, exerts a forward force on the mandrel. In order to facilitate adjustment of the gap, which requires movement of the mandrel in the rearward direction, a rearward acting balancing force is applied to the mandrel, preferably produced by a pressure fluid supplied to a cylinder chamber, and acting on a balancing piston secured to the mandrel. When the balancing force is equal to the forward force, adjustment of the mandrel requires only a small force.

15 Claims, 1 Drawing Figure

PATENTED OCT 17 1972
3,698,846
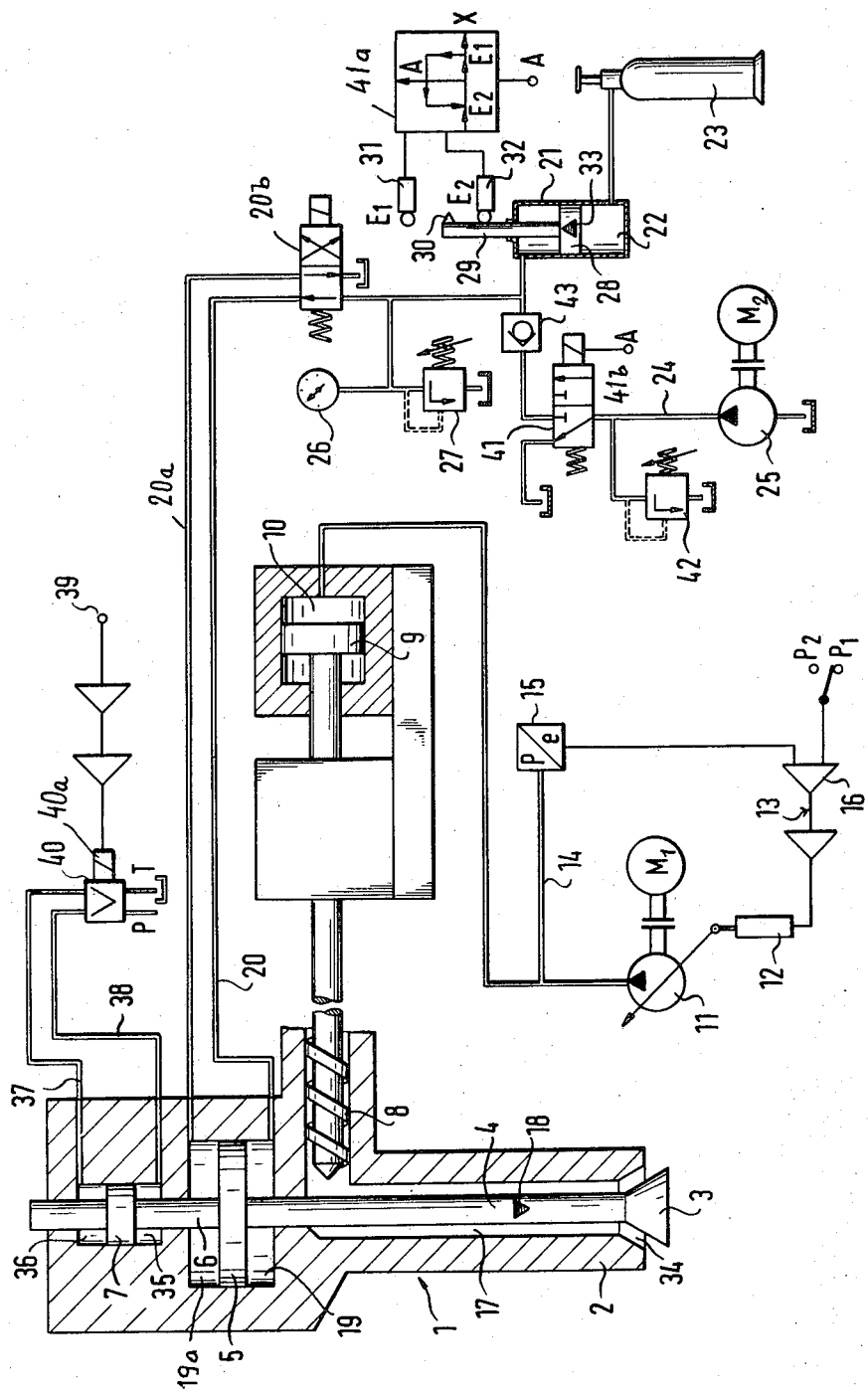
INVENTOR:
*VOLKMAR LEUTNER*
BY:

BALANCING AND ADJUSTING ARRANGEMENT FOR AN EXTRUSION MANDREL

BACKGROUND OF THE INVENTION

The present invention is particularly concerned with apparatus for adjusting the gap through which synthetic plastic material is extruded, particularly in large machines for blowing synthetic plastic material.

The extrusion head forms an annular gap between its extrusion opening and a mandrel, which has to be adjusted to assume a particular position in relation to the extrusion opening to form an annular gap of desired width. This longitudinal adjustment of the mandrel is carried out by cylinder and piston means to which a pressure fluid is selectively applied for moving the mandrel forward or rearward to an adjusted position.

However, the pressure of the material in the pressure chamber of the machine, exerts on the mandrel a force which tends to close, or open, the annular gap, depending on the relative position between the mandrel and the extrusion opening. The force acting on the mandrel in longitudinal direction must be considered for dimensioning the adjustment cylinder and piston means, and the associated servo pump and valve means. Since this force can be substantial, particularly if machines for blowing a synthetic plastic material are concerned, the servo pump, the servo valve, and the adjusting cylinder and piston means must have great dimensions, and particularly the high power required of the servo pump increases the cost of the apparatus.

SUMMARY OF THE INVENTION

It is one object of the invention to facilitate the adjustment of the extrusion gap of an extrusion machine of high power.

Another object of the invention is to balance the force exerted by the extruded material on the mandrel so that a small force is required for moving the mandrel in longitudinal direction during adjustment of the extrusion gap.

Another object of the invention is to provide an arrangement in which a small hydraulic servo motor can be used for adjusting the position of a mandrel in an extrusion opening in a high powered extrusion machine in which the extruded material applies a great force on the mandrel.

The objects of the invention are obtained by applying an additional balancing force to the mandrel by which the force exerted by the extruded mass is compensated and balanced.

Another object of the invention is to apply to the mandrel of an extrusion apparatus, pressure acting opposite to the direction of the force exerted by extruded material on the mandrel.

In the preferred embodiment, the additional balancing force is substantially equal to the force applied by the extruded mass on the mandrel. Since the forces acting on the mandrel balance each other, the adjustment of the mandrel for adjustment of the extrusion gap, requires only a small force for overcoming inertia and gravity of the mass of the mandrel, and frictional forces, in addition to a possible small difference between the balancing force and the extrusion pressure.

As a result, the cylinder and piston means by which the mandrel is adjusted, and the correlated pump and valve means, can be made small and inexpensively manufactured.

In the preferred embodiment of the invention, the extrusion pressure is regulated so that it is substantially constant, and exerts a substantially constant force on the mandrel, which can be compensated by a substantially constant balancing force.

The determination of the actual pressure of the extruded material, and the adjustment of this pressure to a constant value, can be obtained by measuring the pressure of the extruded mass directly in the extrusion chamber, or indirectly in the working chamber of the piston which drives the extrusion piston. It is also possible to measure the longitudinal extension of the mandrel due to the forces acting on the same, and to compare the obtained elongation with a desired constant value corresponding to a desired pressure in the extrusion chamber.

It is advantageous to use a pretensioned resilient means for applying the balancing force on the mandrel. This pretensioned resilient means may be constituted by a hydraulic cylinder cooperating with a hydraulic-pneumatic system which preferably includes an accumulator with a movable piston on which the pressure of a container with compressed nitrogen gas acts for obtaining only a small gradient of a pressure-quantity characteristic. The pretensioning of the hydraulic balancing cylinder is effected by a pump connected by a check valve with the accumulator, and whose pressure is limited by a pressure limiting valve.

Generally speaking, one embodiment of the invention comprises an extrusion head forming an extrusion chamber having an opening; a mandrel in the extrusion chamber forming a gap in the opening; extrusion pressure generating means communicating with the extrusion chamber for extruding a material from the same through the gap whereby a forward force acts on the mandrel in the direction of extrusion; adjusting means for adjusting the position of the mandrel in the direction of extrusion, and in the opposite direction for varying the gap; and balancing force generating means applying a balancing force to the mandrel, acting in the opposite direction to compensate the forward force.

In this manner, the forces acting on the mandrel balance each other whereby a small force is required for the adjustment of the gap by the adjusting means.

In a preferred embodiment of the invention, the extrusion pressure generating means includes an extrusion piston in the extrusion chamber, a working cylinder, a working piston forming a pressure chamber in the working cylinder and being connected with the extrusion piston for movement therewith, and a source of pressure fluid communicating with the working chamber.

The balancing force generating means preferably include a balancing chamber in the extrusion head, a balancing piston secured to the mandrel and closing the balancing chamber, a second source of a pressure fluid, and conduit means connecting the second source with the balancing chamber so that the pressure fluid acts in the same on the balancing piston, and on the mandrel, to urge the same in the opposite direction.

The adjusting means includes a cylinder in the extrusion head, an adjusting piston secured to the mandrel and dividing the cylinder into two adjusting chambers;

and means for selectively supplying a pressure fluid to said two adjusting chambers for displacing the mandrel and for adjusting the gap.

The sources of pressure fluid are preferably regulated pumps. The pump communicating with the working chamber is regulated to a substantially constant pressure, and the pump communicating with the balancing chamber is connected and disconnected from the same in accordance with the pressure in the balancing chamber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing is partly a schematic sectional view, and partly a diagram illustrating hydraulic conduit means, and hydraulic elements connected by the same.

DESCRIPTION OF THE PREFERRED EMBODIMENT

The extrusion head 1 has a mouth or opening 2 in which a mandrel 3 having a stem portion 4 carrying a balancing piston 5, and a stem portion 6 having an adjusting piston 7, is located. The end portion of mandrel 3 is shown to be frusto-conical and forms an annular gap 34 in the mouth 2. An extrusion chamber 17 surrounds the stem portion 4 of mandrel 3, and has a transverse continuation in which an extrusion piston 8 is located, which is connected with a working piston 9 forming a pressure chamber 10 with which a pump 11 communicates through a conduit for driving pistons 9 and 8 into the extrusion chamber 17 so that material is extruded from the same through the annular gap 34. Due to the flow of the material in the extrusion chamber 17 along stem 4 of mandrel 3, a force is exerted on mandrel 3 urging the same in forward direction as indicated by the arrow 18.

The pressure in pressure chamber 10 is maintained constant during the continued extrusion operation by a regulating circuit 13. Pump 11 has a regulator 12 which is controlled by the regulating means 13, as schematically indicated. The actual pressure in the extrusion chamber 17, and in the pressure chamber 10, is transmitted through a conduit 14 to a pressure transformer 15 whose output supplies proportionate pressure to a comparison device 16 in which the actual pressure is compared with a selected desired pressure $P_1$ or $P_2$. When there is a difference between the two pressures compared in the comparison means 16, regulator 12 adjusts pump 11 to maintain the pressure at the level of the desired pressure $P_1$ or $P_2$, and the same pressure prevails and is held constant in pressure chamber 10 and consequently in extrusion chamber 17. In a modified arrangement, conduit 14 is directly connected with extrusion chamber 17, but the effect is the same, and a desired constant pressure is maintained in the extrusion chamber 17. During extrusion of the material from extrusion chamber 10, a force acts on mandrel 3, 4 to urge the same forward, however, the liquid in the balancing chamber 19 is under pressure and exerts a balancing force in the opposite direction to the direction indicated by the arrow 18 on balancing piston 5 so that the forces acting in longitudinal direction on the mandrel 3, 4, can be balanced.

A conduit 20 connects balancing chamber 19 with a first chamber in an accumulator 21. The other chamber 22 formed by a piston 28, communicates with a container 23 for a gas, preferably nitrogen. Due to the pneumatic pressure in chamber 22, counteracting the pressure of the liquid in the upper accumulator chamber 21, the accumulator has a flat pressure-volume characteristic.

A source of pressure liquid in the form of a pump 25 driven by a motor $M_2$, supplies pressure fluid through a shiftable valve 41 and a check valve 43 into conduit 20. Conduit 24 is connected with a pressure limiting valve 42 so that the liquid flows through conduit 24 at a constant predetermined pressure. In the illustrated position, valve 41 guides the pressure liquid from conduit 24 and pump 25 into a discharge opening to a discharge container from which pump 25 may suck liquid in idle circulation. In the other position of valve 41, not shown, but schematically indicated, conduit 24 is connected with check valve 43 and pumps into conduit 20 and balancing chamber 19 to increase the pressure in the same. Check valve 43 blocks flow of pressure fluid from the accumulator to valve 41 and pump 25.

A pressure gauge 26 is connected with conduit 20 and indicates the pressure in the same. A pressure limiting valve 27 is also connected with conduit 20 so that a predetermined pressure cannot be exceeded in the same and in balancing chamber 19. The chamber 19a on the other side of the balancing piston 5 is connected by a conduit 20a with a valve 20b which is shown in a normal position in which pressure fluid can be supplied to balancing chamber 19, and discharged from chamber 19a through conduit 20a and valve 20b into a container from which pump 25 may suck liquid in idle circulation. The flow of liquid to and from the chambers on opposite sides of balancing piston 5 is reversed when valve 20b is shifted.

Piston 28 has a piston rod 30 with an actuator projection cooperating with the actuators $E_1$ and $E_2$ of a pair of switches 31 and 32. An electric switching circuit 41a is operated by switches 31 and 32 when the same are operated by actuator 30 and are electrically connected with electromagnetic means 41b, as schematically indicated by the points A connected with electromagnet 41b and with switching means 41a.

When the pressure in balancing chamber 19 drops, for example due to leakage or a displacement of mandrel 3 by adjusting means 36, 7, piston 28 moves in the direction of the arrow due to the gas pressure in chamber 22, and when actuator 30 engages limit switch 31, the switching means 41a causes energization of electromagnetic means 41b so that the valve 41 is shifted to a position in which pump 25 supplies through conduit 24 and check valve 43 pressure fluid through conduit 20 to the balancing chamber 19 so that the pressure in the same is again increased, and mandrel 3 is urged rearward so that the force exerted on mandrel 3 in the extrusion chamber 17 in the direction of the arrow 18 is again compensated.

The increased pressure also acts in the accumulator chamber 21 and urges piston 28 downward to a position in which actuator 30 operates the switch 32, so that switching means 41a de-energize electromagnetic means 41b so that valve 41 is returned by its spring to the illustrated position in which no pressure fluid is supplied by pump 25 to the balancing chamber 19.

As mentioned above, the stem portion 6 of mandrel 3 carries an adjusting piston 7 located in an adjusting cylinder and forming in the same two chambers 35 and 36. Conduits 37 and 38 are connected with chambers 35 and 36, and with an adjusting valve 40 which can be shifted by electromagnetic means 40a between a position in which high pressure fluid is supplied to chamber 35, while chamber 36 is relieved, and another position in which chamber 36 is supplied with high pressure, and chamber 35 is relieved for adjusting the position of mandrel 3. A regulating circuit 39 is schematically indicated for controlling the electromagnetic means 40a of valve 40 in accordance with a desired value.

Since the pressure in balancing chamber 19 is regulated to apply such a force to piston 5 and stem 4, that the force applied by the material in the extrusion chamber 17 on stem 4 is compensated, only friction forces, or a remaining small pressure differential, has to be overcome by the fluid controlled by valve 40 for adjusting the position of mandrel 3. Consequently, the adjusting means 39, 40 are inexpensive, but obtain any desired adjustment.

Since the regulating circuit 13 maintains the pressure in the extrusion chamber 17 substantially constant, the balancing pressure in balancing chamber 19 can also be substantially constant, which is advantageous since otherwise continuous adjustment of balancing pressure in chamber 19 would be required.

Since the liquid in balancing chamber 19 communicates through conduit 20 with the accumulator chamber 21 which can expand against the pressure in the gas chamber 22 supplied with nitrogen from container 23, the fluid in balancing chamber 19, conduit 20, and accumulator chamber 21 has the effect of a resilient means of low rigidity. However, it is possible to place a spring in the balancing chamber 19.

It is possible to omit valve 41, and provide a simple accumulator instead of accumulator 21, 22, 29 in which event pump 25 continuously pumps liquid through the check valve 42, while the pressure limiting valve 42 limits the pressure which corresponds to the pressure of the gas in the accumulator.

The construction of the extrusion head 1 is no part of the present invention, and the extrusion piston 8, which acts as a plunger and extrusion screw, could be replaced by an independent plunger and an independent extrusion screw, as will be understood by those skilled in the art.

It will be understood that each of the elements described above, or two or more together, may also find a useful application in other types of adjusting apparatus for an extrusion mandrel differing from the types described above.

While the invention has been illustrated and described as embodied in a balancing and adjusting arrangement for an extrusion mandrel in which the pressure of the extrusion mass on the mandrel is compensated by a balancing force acting on a piston portion of the mandrel, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Balancing and adjusting arrangement for an extrusion mandrel, comprising: an extrusion head forming an extrusion chamber having an opening; a mandrel in said extrusion chamber forming a gap in said opening; extrusion pressure generating means communicating with said extrusion chamber for extruding a material from the same through said gap whereby a forward force acts on said mandrel in the direction of extrusion; adjusting means for adjusting the position of said mandrel in said direction of extrusion and in the opposite direction for varying said gap; and balancing force generating means applying a balancing force to said mandrel acting in said opposite direction to compensate said forward force so that the forces acting on said mandrel balance each other whereby a small force is required for the adjustment of said gap by said adjusting means.

2. Arrangement as claimed in claim 1 wherein said balancing force generating means include control means for adjusting said balancing force to be equal to said forward force.

3. Arrangement as claimed in claim 1 wherein said extrusion pressure generating means include regulating means for maintaining the pressure in said extrusion chamber constant.

4. Arrangement as claimed in claim 1 wherein said extrusion pressure generating means include an extrusion piston in said extrusion chamber, a working cylinder, a working piston forming a pressure chamber in said working cylinder and being connected with said extrusion piston for movement therewith, and a source of pressure fluid communicating with said working chamber.

5. Arrangement as claimed in claim 4 wherein said extrusion pressure generating means comprise comparison means responsive to the actual pressure in one of said chambers and comparing the same with a desired pressure, and a regulator controlled by said comparison means for adjusting said source of pressure fluid so that said desired pressure is maintained in said chambers and the extrusion pressure is maintained constant at said desired pressure.

6. Arrangement as claimed in claim 5 wherein said one chamber is said extrusion chamber.

7. Arrangement as claimed in claim 5 wherein said one chamber is said pressure chamber.

8. Arrangement as claimed in claim 4 wherein said extrusion pressure generating means include regulating means including means for sensing the elastic extension of said mandrel due to said opposite forces and means for comparing said extension with a desired value, and a regulator controlled by said regulating means for adjusting said source of pressure fluid so that the extrusion pressure is maintained constant at said desired value.

9. Arrangement as claimed in claim 1 wherein said balancing force generating means include resilient means of low rigidity.

10. Arrangement as claimed in claim 1 wherein said balancing force generating means include a balancing chamber in said extrusion head, a balancing piston secured to said mandrel and closing said balancing chamber, a source of pressure fluid, and conduit means connecting said source with said balancing chamber so that said pressure fluid acts in the same on said balancing piston and said mandrel to urge the same in said opposite direction.

11. Arrangement as claimed in claim 10 wherein said balancing force generating means further include an accumulator communicating with said conduit means so that the pressure fluid in said balancing chamber can resiliently yield.

12. Arrangement as claimed in claim 11 wherein said accumulator includes a cylinder, and a piston forming first and second chambers in said cylinder, said first chamber communicating with said conduit means and said balancing chamber; and a source of pressure gas communicating with said second chamber for influencing the resilience of said pressure fluid in said balancing chamber, conduit means, and first chamber.

13. Arrangement as claimed in claim 12 wherein said source of pressure fluid is a pump, and wherein said balancing force generating means further include a valve between said conduit means and said pump, and including electric operating means for moving said valve between open and closed positions, and electric switching means connected with said electric operating means and actuated by said said piston so that said valve is closed and opened when said piston responds to high, and low pressure, respectively, in said first chamber and said balancing chamber.

14. Arrangement as claimed in claim 1 wherein said extrusion pressure generating means include an extrusion piston in said extrusion chamber, a working cylinder, a working piston forming a pressure chamber in said working cylinder and being connected with said extrusion piston for movement therewith, and a source of pressure fluid communicating with said working chamber; and wherein said balancing force generating means include a balancing chamber in said extrusion head, a balancing piston secured to said mandrel and closing said balancing chamber, a second source of a pressure fluid, and conduit means connecting said second source with said balancing chamber so that said pressure fluid acts in the same on said balancing piston and said mandrel to urge the same in said opposite direction.

15. Arrangement as claimed in claim 1 wherein said adjusting means include a cylinder in said extrusion head, an adjusting piston secured to said mandrel and dividing said cylinder into two adjusting chambers; and means for selectively supplying a pressure fluid to said two adjusting chambers for displacing said mandrel and for adjusting said gap.

* * * * *